(No Model.)
W. D. HELTSLEY.
ANIMAL TRAP.
No. 386,009. Patented July 10, 1888.
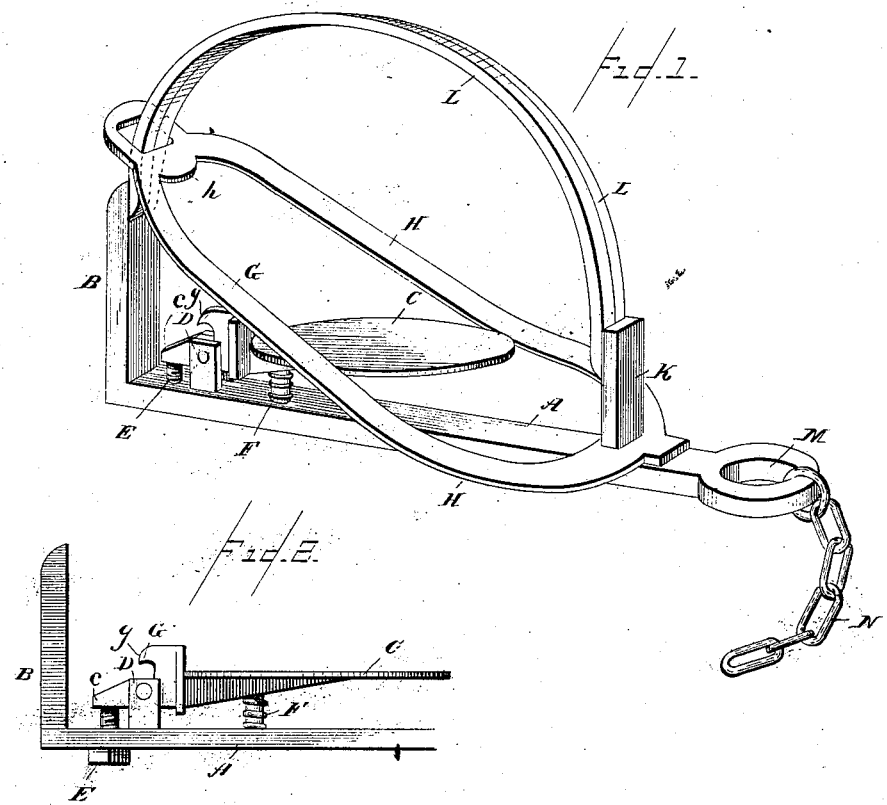
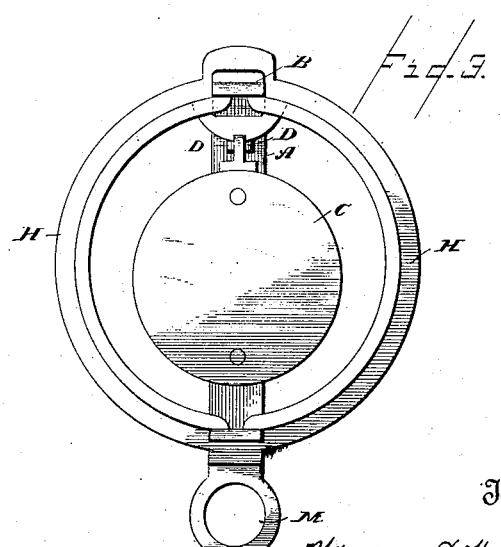
Witnesses.
Edwin L. Bradford
Frank Dorian
Inventor
William D. Heltsley
By his Attorney in fact
Chas. E. Barber

UNITED STATES PATENT OFFICE.

WILLIAM D. HELTSLEY, OF GREENVILLE, KENTUCKY.

ANIMAL-TRAP.

SPECIFICATION forming part of Letters Patent No. 386,009, dated July 10, 1888.

Application filed August 11, 1887. Serial No. 246,751. (No model.)

*To all whom it may concern:*

Be it known that I, WILLIAM D. HELTSLEY, a citizen of the United States, residing at Greenville, in the county of Muhlenberg, 5 State of Kentucky, have invented certain new and useful Improvements in Self-Setting Traps, of which the following is so full, clear, and exact a description as will enable others skilled in the art to which my invention appertains to make and use the same, reference being had to the accompanying drawings, in which—

Figure 1 is a perspective view of my invention, showing the trap sprung. Fig. 2 is a detail view of the pan of the trap, showing the manner of mounting the same on the frame. Fig. 3 is a top plan view of the trap as it appears when it is set.

In each of the accompanying figures, A designates a bar, which is bent up at B, and to which is secured the pan C, which is pivoted to the bracket D. Between the bracket D and the vertical arm B, I secure a set-screw, E, the purpose of which is to gage the elevation of the free end of the pan when the trap is set. Beneath the central main portion of the pan C is a spring, F, the purpose of which is to keep the pan normally horizontal. The opposite end of the pan is provided with a projection, e, which is adapted to strike against the upper end of the set-screw E, to limit the upward movement of the free end of the pan C. Above the pivotal point of the pan C is a catch, G, which is adapted to engage with a projection, h, on the spring H, which spring H is rigidly secured to the post K, and is adapted to encircle the arm B and the jaws L L when the trap is sprung or closed. The bar A is provided with a perforation, M, at its end for the reception of a chain, N. The jaws L L are pivotally secured to the post K and the arm B.

The operation of my device is as follows: By depressing the free end of the spring H it will be forced down into alignment with the main portion of the pan C. The projection h, as it presses against the curved face g of the projection G, will cause the pan C to yield a sufficient distance to permit the projection h to pass the outer limit of the projection G. The spring f underneath the pan C will cause the pan to resume its horizontal position as soon as the projection h passes below the line of the under side of the projection G, and the trap will be set. By relieving the pressure on the outer end of the spring H it will by its own resiliency bear up against the projection G, where it will remain, and the jaws L L of the trap will drop open, as shown in Fig. 3. The trap can then be placed in any desired position or location, where it will remain set until it is sprung by some foreign obstacle—such, for instance, as an animal's foot, a bird's beak, &c.

Heretofore great difficulty has been experienced in setting traps, as it often occurs that the trapper's fingers are cold, while the trap may be covered with ice and snow, which will make it extremely slippery and difficult to handle. Another decided disadvantage exists in the danger of the trapper's catching his fingers between the jaws of a trap whose action is not automatic.

By the employment of a device such as is described and shown in this application these difficulties will be avoided, time will be saved, and the unpleasantness connected with the use of a trap which is not automatic will be greatly lessened.

Having now described the objects, uses, and advantages of my device, what I believe to be new, and desire to secure by Letters Patent of the United States, and what I therefore claim, is—

1. In a trap, the combination of the jaws, a spring which encircles the same, and a pan pivoted to the trap and provided with a catch above the line of the pivotal point of the pan, and a set-screw between the pivotal point of the pan and the outer end of the trap, substantially as and for the purposes specified.

2. In a trap, the jaws and main spring provided with a projection which projects in toward the pan of the trap, in combination with a pan which is pivotally secured to the trap, and which is provided on its inner end with a projection for engagement with the said projection on the spring of the trap, and a secondary spring located beneath the pan of the trap, substantially as and for the purposes specified.

3. In a trap of the character described, the pan pivotally secured to the trap and provided with a projection and a set-screw at one side of the pivotal point, and having a spring beneath the pan and at the opposite side of the pivotal point, in combination with a main spring for the jaws, and a projection on said main spring for engagement with the catch on the pan of the trap, all constructed and combined to operate substantially as described, and for the purposes specified.

In testimony whereof I affix my signature in the presence of two witnesses.

WILLIAM D. HELTSLEY.

Witnesses:
E. R. WEIR, Jr.,
WM. H. HARDISON.